(12) United States Patent
Gao

(10) Patent No.: US 9,231,257 B2
(45) Date of Patent: Jan. 5, 2016

(54) BIPOLAR PLATE FOR FUEL CELL INCLUDING NON-ELECTROCHEMICAL REACTION REGION COMPRISING A NON-CONDUCTIVE MATERIAL

(76) Inventor: Yong Gao, Shanghai (CN)

( * ) Notice: Subject to any disclaimer, the term of this patent is extended or adjusted under 35 U.S.C. 154(b) by 286 days.

(21) Appl. No.: 13/638,616

(22) PCT Filed: Mar. 29, 2011

(86) PCT No.: PCT/CN2011/072272
§ 371 (c)(1),
(2), (4) Date: Sep. 30, 2012

(87) PCT Pub. No.: WO2011/120426
PCT Pub. Date: Oct. 6, 2011

(65) Prior Publication Data
US 2013/0022896 A1    Jan. 24, 2013

(30) Foreign Application Priority Data

Mar. 30, 2010 (CN) .......................... 2010 1 0136286

(51) Int. Cl.
| H01M 8/02 | (2006.01) |
| H01M 8/04 | (2006.01) |
| H01M 8/24 | (2006.01) |
| H01M 8/10 | (2006.01) |

(52) U.S. Cl.
CPC .......... *H01M 8/0221* (2013.01); *H01M 8/0273* (2013.01); *H01M 8/0286* (2013.01); *H01M 8/242* (2013.01); *H01M 2008/1095* (2013.01); *Y02E 60/50* (2013.01)

(58) Field of Classification Search
CPC .................... H01M 8/02–8/22; H01M 8/0221; H01M 8/0273; H01M 8/0286; H01M 8/242
USPC .................. 429/508, 447, 456, 450, 492, 465
See application file for complete search history.

(56) References Cited

U.S. PATENT DOCUMENTS

| 2004/0161653 | A1* | 8/2004 | Andrews et al. ................ 429/34 |
| 2004/0170883 | A1* | 9/2004 | Bartholomeyzik et al. ..... 429/36 |
| 2004/0191603 | A1* | 9/2004 | Kaiser et al. .................... 429/34 |
| 2006/0275643 | A1* | 12/2006 | Abd Elhamid et al. ......... 429/38 |
| 2008/0241637 | A1* | 10/2008 | Burdzy ........................... 429/36 |
| 2009/0214930 | A1* | 8/2009 | Charlat et al. .................. 429/35 |

FOREIGN PATENT DOCUMENTS

EP        1284512 A2 *  2/2003  ............. H01M 8/02

* cited by examiner

*Primary Examiner* — Kenneth Douyette
(74) *Attorney, Agent, or Firm* — Han IP Corporation; Andy M. Han

(57) ABSTRACT

A bipolar plate for fuel cell has an electrochemical reaction region and a non-electrochemical reaction region connected together. The electrochemical reaction region is at the center position of the bipolar plate. The non-electrochemical reaction region is made of non-conductive material and is located around the electrochemical reaction region. The bipolar plate reduces loss, raises work efficiency, and is easy to produce. The material cost of the bipolar plate is effectively reduced.

20 Claims, 1 Drawing Sheet

BIPOLAR PLATE FOR FUEL CELL INCLUDING NON-ELECTROCHEMICAL REACTION REGION COMPRISING A NON-CONDUCTIVE MATERIAL

CROSS-REFERENCE TO RELATED APPLICATION

This application is the U.S. national stage application of International Application No. PCT/CN2011/072272, filed on Mar. 29, 2011, which claims the priority benefit of Chinese Patent Application No. 201010136286.8, filed on Mar. 30, 2010. The above-identified patent applications are hereby incorporated by reference.

TECHNICAL FIELD

The invention relates to the technical field of fuel cell, and more particularly, relates to a bipolar plate for fuel cell.

BACKGROUND

Fuel cells are typically composed of a plurality of cell units with each comprising two electrodes (anode and cathode). These two electrodes are separated from each other by an electrolyte element and assembled with each other in series to form a fuel cell stack. Electrochemical reaction is implemented by supplying proper reactants to each electrode, i.e., supplying fuel to one electrode and oxidant to the other electrode, as a result, potential difference is formed between the electrodes and accordingly, electric energy is generated.

In order to supply reactants to each electrode, a particular interfacial element which is usually known as "bipolar plate" and disposed at two sides each individual cell is used. The bipolar plate is usually in the form of individual element disposed in the vicinity of anode or cathode support body. The bipolar plate is a key element for fuel cell pack. In the operating process of the fuel cell stack, the bipolar plates perform the following functions for the purpose of maintaining the optimal working state and service life of the fuel cell stack: (1) electrical conductor of cell, cathode and anode are formed at the two sides of the bipolar plate respectively, thus plenty of cell units are connected in series to form the fuel cell stack; (2) reaction gas (mass transfer) is supplied to the electrodes through channels; (3) managements for water and heat are coordinated so as to prevent medium cooling and leakage of reaction gas; and (4) structural strength support is offered to membrane electrode assembly (MEA).

To perform the functions above, the material of the bipolar plate requires high electrical conductivity, sufficient mechanical strength, excellent thermal conductivity, low air permeability and corrosion resistance, and is capable of being chemically stable in a working environment of cell for a quite long time. Furthermore, in view of the requirements on design as well as processing and manufacturing easiness, the material of the bipolar plate should also have the features of light weight, small size, low cost, and even recyclability, etc.

The material adopted must be electrochemical corrosion-resistant and superior in structural strength and stability owing to the electrochemical reaction working environment of fuel cell. Hence, factors in all respects must be taken into full consideration when a high-performance bipolar plate for cell is designed. Typically, the materials of the bipolar plate for cell include: carbon plate, metal plate and the like. Traditionally, the use of carbon plate as polar plate for cell is attributed to its good electrical conductivity, heat transfer property and corrosion resistance. And the reason for using metal plate lies in its excellent electrical conductivity, structural strength and formability and in the fact that it is still a good material of electrode plate even after anti-corrosion surface treatment.

In addition, considering that the manufacturing cost of polar plate for cell is high, to lower the cost of fuel cell, one of the attempting directions in fuel cell's design is to seek for the design and manufacturing method for optimizing the bipolar plate for cell.

SUMMARY

The objective of the invention is to provide a bipolar plate for fuel cell in order to optimize the design of current bipolar plate for fuel cell.

The objective of the invention is implemented through the technical proposal as follows:

A bipolar plate for fuel cell comprises an electrochemical reaction region and a non-electrochemical reaction region that are joined with each other.

Further, the electrochemical reaction region is located centrally, and the non-electrochemical reaction region is located around the electrochemical reaction region.

Further, the non-electrochemical reaction region is made of a non-conductive material.

Further, the material density of the non-electrochemical reaction region is 0.1 to 1.5 g/cm$^3$.

Further, the non-electrochemical reaction region is provided with a reactant conveying passage.

Further, the non-electrochemical reaction region is provided with mounting holes.

Further, a part of the electrochemical reaction region for joining with the non-electrochemical reaction region is connected with a corresponding joining part of the non-electrochemical reaction region in an adhesive manner.

Further, a part of the electrochemical reaction region for joining with the non-electrochemical reaction region is connected with a corresponding joining part of the non-electrochemical reaction region in a squeezing manner.

Further, a part of the electrochemical reaction region for joining with the non-electrochemical reaction region is connected with a corresponding joining part of the non-electrochemical reaction region in a hot-pressing manner.

Further, a part of the electrochemical reaction region for joining with the non-electrochemical reaction region is step-shaped, and a joining part of the non-electrochemical reaction region is reverse step-shaped correspondingly.

Further, a part of the electrochemical reaction region for joining with the non-electrochemical reaction region is saw tooth-shaped, and a joining part of the non-electrochemical reaction region is reverse saw tooth-shaped correspondingly.

Further, a part of the electrochemical reaction region for joining with the non-electrochemical reaction region is one or more than one protrusions, and a joining part of the non-electrochemical reaction region is one or more than one corresponding grooves.

Further, a part of the electrochemical reaction region for joining with the non-electrochemical reaction region is one or more than one grooves, and a joining part of the non-electrochemical reaction region is one or more than one corresponding protrusions.

Further, the joining sidewalls of the electrochemical reaction region and the non-electrochemical reaction region are correspondingly provided with an annular groove respectively, and the annular groove is internally provided with an annular sealing strip.

Further, the electrochemical reaction region and the non-electrochemical reaction region have the same thickness.

In the invention, the bipolar plate for fuel cell is divided into the electrochemical reaction region and the non-electrochemical reaction region that are combined and joined to form the entire bipolar plate, and a new fuel cell is manufactured by laminating such bipolar plates. The design of this bipolar plate for fuel cell optimizes the conductivity of bipolar plate, reduces the loss, enhances the efficiency, and simultaneously lowers the material cost and simplifies the manufacturing complexity.

Further description is made below to the invention with reference to the drawings and the embodiments.

DETAILED DESCRIPTION OF SAMPLE EMBODIMENTS

Embodiment 1

Figure 1:
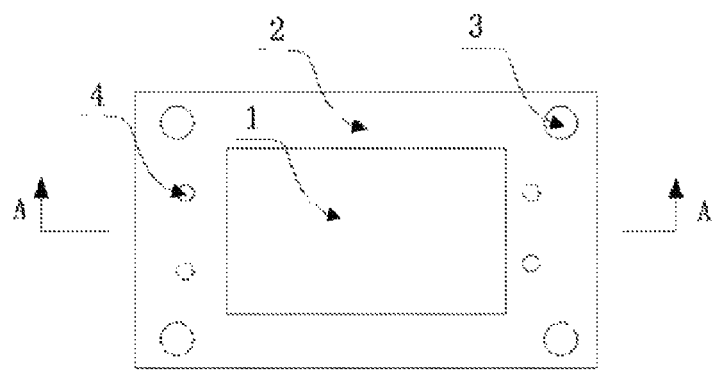
FIG. 1 is a structural schematic diagram of the embodiment 1 of the joined bipolar plate for fuel cell in accordance with the invention.

As shown in FIG. 1, a bipolar plate for fuel cell comprises an electrochemical reaction region 1 and a non-electrochemical reaction region 2 that are joined with each other.

In the invention, the electrochemical reaction region 1 of the bipolar plate 10 is an region where fuel supplied reacts with oxidant, this region is corresponding to a proton exchange membrane, and to the parts on the bipolar plate which come into direct contact with the proton exchange membrane, such as channel and gas diffusion layer, and generally, the proton exchange membrane is further provided with a catalyst coating. The non-electrochemical reaction region 2 is a region where no electrochemical reaction occurs. The non-electrochemical reaction region 2 is used for supporting the electrochemical reaction region 1 and withstanding external acting forces.

The electrochemical reaction regions 1 and the non-electrochemical reaction region 2 of the bipolar plate are divided in design, which could reduce design difficulty. For example, the material for the bipolar plate in the electrochemical reaction region 1 may be materials that meet the demands of the bipolar plate for fuel cell, e.g., carbon plate, metal plate and the like. And the material for the bipolar plate in the non-electrochemical reaction region 2 may be materials with certain strength and heat resistance, low cost and easy machining and formation. These two regions can be recovered respectively and then reused even if the electrochemical reaction region 1 becomes ineffective. As a result, fuel cell stack becomes more environment-friendly.

Further, the non-electrochemical reaction region 2 is made of a non-conductive material, such as ABS (styrene-butadiene-acrylonitrile-based ternary copolymer), PVC (polyvinyl chloride) and other insulating materials, and particularly, some materials with small density can be used for this region, for example, the material density of the non-electrochemical reaction region 2 is 0.1 to 1.5 g/cm$^3$, those skilled in this art could flexibly select the material of this region as required, and the non-electrochemical reaction region can support the electrochemical reaction region 1, withstand external acting forces and be insulating only if the material meets the demands on the performances of material for this region in the invention. In this way, the weight of fuel cell manufactured can be remarkably reduced to further lower energy consumption. In the prior bipolar plates for fuel cell, both the reaction region and the non-reaction region at the periphery thereof are made of the same or similar conductive material, causing that a part of current generated by reaction passes through the non-reaction region at the periphery of the reaction region to form eddy current, as a result, gradient deviation of current and loss of current could be caused, and this disadvantageous current distribution is possibly liable to result in the shortening of the service life of fuel cell stack and even the occurrence of current short circuit. According to this invention, the electrochemical reaction region 1 and the non-electrochemical reaction region 2 of the bipolar plate are separated in design and insulating materials are used for fabrication of the non-electrochemical reaction region 2, so current could pass through the electrochemical reaction region 2 uniformly to avoid the generation of eddy current and improve the service life of fuel cell, prevent the occurrence of current short circuit and enhance the application safety of fuel cell.

Wherein, electrochemical reaction region is at the center position of the bipolar plate. The non-electrochemical reaction region is located around the electrochemical reaction region.

Wherein, the non-electrochemical reaction region 2 is provided with a reactant conveying passage 4 connected to channels of the electrochemical reaction region 1. The conveying passage 4 is used for conveying reactant of the electrochemical reaction region 1. The specific communication way and structure between the conveying passage 4 and the channel of the non-electrochemical reaction region 2 may be achieved by a number of techniques in prior art of bipolar plate designs, so detailed description regarding this part is herein omitted.

Wherein, the non-electrochemical reaction region 2 is provided with mounting holes 3 for the assembly of fuel cell stack. Compared with the current integrally-designed bipolar plate for fuel cell, the bipolar plate for fuel cell provided by the invention is lower in cost since no reaction occurs in the non-electrochemical reaction region 2 and the material of this region is convenient for forming and machining, so the total weight of the materials of fuel cell is reduced dramatically as well, the worry about damage to the bipolar plate during assembly is avoided, and the assembly requirement of fuel cell stack is lessened.

Wherein, based on manufacturing conditions, the part of the electrochemical reaction region 1 for joining with the non-electrochemical reaction region 2 may be achieved in a number of approaches, such as joining subsequent to adhesion, hot pressing and squeezing, etc.

Embodiment 2

Figure 2:
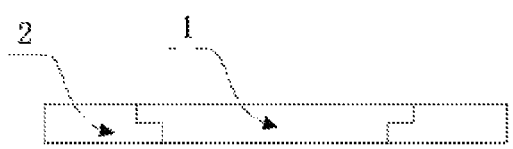
FIG. 2 is an A-A sectional view of the embodiment 2 of the joined bipolar plate for fuel cell in accordance with the invention.

As shown in FIG. 2, this embodiment is the same as the embodiment 1 except the shape of the joining part. FIG. 2 is an A-A sectional view of FIG. 1, in FIG. 2, the part of the electrochemical reaction region 1 for joining with the non-electrochemical reaction region 2 is step-shaped, and the joining part of the non-electrochemical reaction region 2 is reverse step-shaped correspondingly.

Embodiment 3

Figure 3:
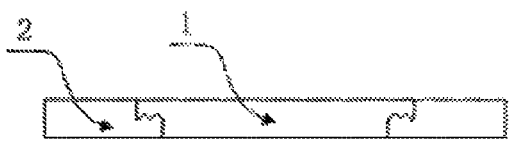
FIG. 3 is an A-A sectional view of the embodiment 3 of the joined bipolar plate for fuel cell in accordance with the invention.

As shown in FIG. 3, this embodiment is the same as the embodiment 1 except the shape of the joining part. FIG. 3 is an A-A sectional view of FIG. 1, in FIG. 3, the part of the electrochemical reaction region 1 for joining with the non-electrochemical reaction region 2 is saw tooth-shaped, and the joining part of the non-electrochemical reaction region 2 is reverse saw tooth-shaped correspondingly.

Embodiment 4

Figure 4:
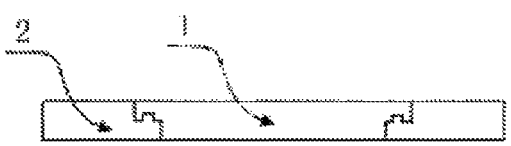
FIG. 4 is an A-A sectional view of the embodiment 4 of the joined bipolar plate for fuel cell in accordance with the invention.

As shown in FIG. 4, this embodiment is the same as the embodiment 1 except the shape of the joining part. FIG. 4 is an A-A sectional view of FIG. 1, in FIG. 4, the part of the electrochemical reaction region 1 for joining with the non-electrochemical reaction region 2 is one or more than one protrusions, and the joining part of the non-electrochemical reaction region 2 is one or more than one corresponding grooves.

Alternatively, the part of the electrochemical reaction region 1 for joining with the non-electrochemical reaction region 2 is one or more than one grooves, and the joining part of the non-electrochemical reaction region 2 is one or more than one corresponding protrusions.

Embodiment 5

Figure 5:
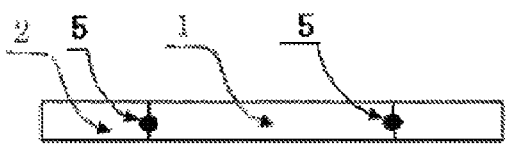
FIG. 5 is an A-A sectional view of the embodiment 5 of the joined bipolar plate for fuel cell in accordance with the invention.

As shown in FIG. 5, this embodiment is the same as the embodiment 1 except the shape of the joining part. FIG. 5 is an A-A sectional view of FIG. 1, in FIG. 5, the joining sidewalls of the electrochemical reaction region 1 and the non-electrochemical reaction region 2 are correspondingly provided with an annular groove respectively, and the annular groove is internally provided with an annular sealing strip 5. The sealing of the joining parts at the sealing strips 5 is realized by the sealing strips 5.

During mounting, the annular sealing strips 5 can be embedded in the annular grooves of the electrochemical reaction region 1 at first, and then the electrochemical reaction region 1 is pressed into the non-electrochemical reaction region 2.

The embodiments discussed above are merely for describing the technical concept and features of the invention, their objective is that those skilled in this art could understand the content of the invention and implement therefrom, limitation to the patent scope of the invention cannot be made only by these embodiments, for example, the connection between the electrochemical reaction region 1 and the non-electrochemical reaction region 2 is implemented in other joining ways, and any other equivalent variations or modifications shall be contemplated as being within the patent scope of the invention only if the bipolar plate is designed in such a manner that the electrochemical reaction region and the non-electrochemical reaction region are separated from each other.

What is claimed is:

1. A bipolar plate, configured for a cathode and an anode to be formed on two opposite sides thereof, for a fuel cell, comprising:
    an electrochemical reaction region comprising a first primary side and a second primary side opposite the first primary side thereof, the electrochemical reaction region further comprising a plurality of edges disposed between the first and second primary sides; and
    a non-electrochemical reaction region joined with the electrochemical reaction region, the non-electrochemical reaction region comprising a first primary side and a second primary side opposite the first primary side thereof, the non-electrochemical reaction region further comprising a plurality edges that join with the plurality of edges of the electrochemical reaction region,
    wherein, when the electrochemical reaction region and the non-electrochemical reaction region are joined together, the first primary side of the electrochemical reaction region is flush with the first primary side of the non-electrochemical reaction region and the second primary side of the electrochemical reaction region is flush with the second primary side of the non-electrochemical reaction region, and
    wherein each of the edges of the electrochemical reaction region comprises an indentation and each of the edges of the non-electrochemical reaction region comprises an indentation such that the electrochemical reaction region and the non-electrochemical reaction region are joined together by the indentations of the edges of the electrochemical reaction region mating with the indentations of the edges of the non-electrochemical reaction region.

2. The bipolar plate for a fuel cell according to claim 1, wherein the electrochemical reaction region is located centrally, and wherein the non-electrochemical reaction region is located around the electrochemical reaction region.

3. The bipolar plate for a fuel cell according to claim 2, wherein the non-electrochemical reaction region is made of a non-conductive material.

4. The bipolar plate for a fuel cell according to claim 3, wherein a material density of the non-electrochemical reaction region is 0.1 to 1.5 $g/cm^3$.

5. The bipolar plate for a fuel cell according to claim 3, wherein the non-electrochemical reaction region includes a reactant conveying passage.

6. The bipolar plate for a fuel cell according to claim 1, wherein the non-electrochemical reaction region includes mounting holes.

7. The bipolar plate for a fuel cell according to claim 1, wherein a part of the electrochemical reaction region for joining with the non-electrochemical reaction region is connected with a corresponding joining part of the non-electrochemical reaction region in an adhesive manner.

8. The bipolar plate for a fuel cell according to claim 1, wherein a part of the electrochemical reaction region for joining with the non-electrochemical reaction region is connected with a corresponding joining part of the non-electrochemical reaction region in a squeezing manner.

9. The bipolar plate for a fuel cell according to claim 1, wherein a part of the electrochemical reaction region for joining with the non-electrochemical reaction region is connected with a corresponding joining part of the non-electrochemical reaction region in a hot-pressing manner.

10. The bipolar plate for a fuel cell according to claim 1, wherein a part of the electrochemical reaction region for joining with the non-electrochemical reaction region is step-shaped, and wherein a joining part of the non-electrochemical reaction region is reverse step-shaped correspondingly.

11. The bipolar plate for a fuel cell according to claim 1, wherein a part of the electrochemical reaction region for joining with the non-electrochemical reaction region is saw tooth-shaped, and wherein a joining part of the non-electrochemical reaction region is reverse saw tooth-shaped correspondingly.

12. The bipolar plate for a fuel cell according to claim 1, wherein a part of the electrochemical reaction region for joining with the non-electrochemical reaction region includes one or more protrusions, and wherein a joining part of the non-electrochemical reaction region includes one or more corresponding grooves.

13. The bipolar plate for a fuel cell according to claim 1, wherein a part of the electrochemical reaction region for joining with the non-electrochemical reaction region includes one or more grooves, and wherein a joining part of the non-electrochemical reaction region includes one or more corresponding protrusions.

14. The bipolar plate for a fuel cell according to claim 1, wherein the electrochemical reaction region and the non-electrochemical reaction region have a same thickness.

15. A bipolar plate for a fuel cell, comprising:
an electrochemical reaction region comprising a first primary side and a second primary side opposite the first primary side thereof, the electrochemical reaction region further comprising a plurality of edges around an outer circumference of the electrochemical reaction region and disposed between the first and second primary sides;
a non-electrochemical reaction region joined with the electrochemical reaction region, the non-electrochemical reaction region comprising a first primary side and a second primary side opposite the first primary side thereof, the non-electrochemical reaction region further comprising a plurality edges around an inner circumference of the non-electrochemical reaction region and configured to join with the plurality of edges of the electrochemical reaction region; and
an annular sealing strip,
wherein, when the electrochemical reaction region and the non-electrochemical reaction region are joined together, the first primary side of the electrochemical reaction region is flush with the first primary side of the non-electrochemical reaction region and the second primary side of the electrochemical reaction region is flush with the second primary side of the non-electrochemical reaction region, and
wherein each of the edges of the electrochemical reaction region and the edges of the non-electrochemical reaction region comprises an annular groove such that, when the electrochemical reaction region and the non-electrochemical reaction region are joined together, the annular sealing strip is accommodated in a space formed between the edges of the electrochemical reaction region and the non-electrochemical reaction region.

16. The bipolar plate for a fuel cell according to claim 15, wherein the electrochemical reaction region is located centrally, and wherein the non-electrochemical reaction region is located around the electrochemical reaction region.

17. The bipolar plate for a fuel cell according to claim 16, wherein the non-electrochemical reaction region is made of a non-conductive material.

18. The bipolar plate for a fuel cell according to claim 17, wherein a material density of the non-electrochemical reaction region is 0.1 to 1.5 g/cm$^3$.

19. The bipolar plate for a fuel cell according to claim 17, wherein the non-electrochemical reaction region includes a reactant conveying passage.

20. The bipolar plate for a fuel cell according to claim 15, wherein the electrochemical reaction region and the non-electrochemical reaction region have a same thickness.

\* \* \* \* \*